(No Model.)

H. A. DERAISMES.
BAGGAGE CHECK AND TICKET.

No. 424,963.                    Patented Apr. 8, 1890.

RECORD CHECK.

Tick't Check No. 1018.
FROM New York
TO Philadelphia
VIA P. & R. R. R. Co.
Paid $---- for ---- lbs
Extra baggage Book No. 50.

BAGGAGE MASTERS NOTICE CHECK

Tick't Check No. 1018. Book No. 50.
G—— A. S——Gen. Bag'e Mas.
Sir: I have this day issued
CHECK No. 1018
To Philadelphia
VIA P. & R. R. R. Co.
upon which I have collected for Extra
Baggage $----, also the regular
charges for use of this Check.
N. Y. Station    G. D. Agent.

BAGGAGE TICKET CHECK.

Ticket Check No. 1018.
FROM New York
TO Philadelphia
VIA
P. & R. R. R. Co.

PASSENGERS TICKET CHECK

Ticket Check No. 1018.
FROM New York
TO Philadelphia
VIA
P. & R. R. R. Co.

P. & R. R. R. Co.

Insurans Ticket No. 1018.
When in transit the baggage
to which a check identified with
this ticket is attached is hereby
insured for ---- hours or
less if said check is in use a
shorter time, to the amount of
---- dollars, or if the bag-
gage is of less value, then to
the full amount of its value.
Attest ---- J. ----    J. A. T.
           President.
Sec'y Witnesses:
Henry Sibling
John Hower Inventor
Hippolite A. Deraismes
by Duncan, Curtis & Page
Attorneys

THE NORRIS PETERS CO., PHOTO-LITHO., WASHINGTON, D. C.

UNITED STATES PATENT OFFICE.

HIPPOLITE A. DERAISMES, OF ELIZABETH, NEW JERSEY.

BAGGAGE CHECK AND TICKET.

SPECIFICATION forming part of Letters Patent No. 424,963, dated April 8, 1890.

Application filed August 14, 1886. Serial No. 210,904. (No model.)

*To all whom it may concern:*

Be it known that I, HIPPOLITE A. DERAISMES, of Elizabeth, in the county of Union and State of New Jersey, have invented a new and useful Improvement in Baggage Checks and Tickets, of which the following is a specification.

The present invention relates to a combination of tickets or checks adapted for use in checking baggage to insure its protection and safe delivery to its owner or his agent.

The invention consists of two baggage-checks connected or identified with each other by corresponding numbers or marks, (one of which is in practice to be secured to an article of baggage and the other to be in the possession of the passenger having charge of such baggage as means of its identification and recovery,) in combination with an insurance ticket or certificate attached to or identified with the check or ticket given to the passenger; also, of the combination, with two checks or tickets, one attached to the baggage and the other given to the passenger, of a notice or report ticket identified with said check-tickets; also, of the combination, with said checks or tickets, one for use on the baggage and the other for the passenger, of a record or stub ticket identified with said check-tickets; also, of the combination, with said baggage and passenger checks and report-ticket, of said record stub-ticket.

My invention is illustrated in the accompanying drawing, in which the figure is a plan view of a series of checks or tickets.

In the drawing, A represents the check to be given to the passenger upon the surrender of his baggage to the carrier. This check is preferably marked with name or initials of the company, as are all the other checks or tickets of the series. It may also contain directions or instructions for the disposition of the baggage, as the place from which and to which it is to be carried, or any other directions or instructions relating to its disposition.

B is a check to be secured to the baggage, and preferably is substantially a duplicate of A. It is to carry directions for the disposition of the baggage, in order to make it applicable to checking baggage for transportation.

These two checks are preferably printed with the names of the months of the year and the days of the months, these corresponding names and dates being so disposed upon the several checks that when the checks are folded together along a determined line the corresponding names and dates will be superimposed upon each other, so that at one motion any desired month or day can be cut out with a proper punch. This marking for the dates may be upon the rear face of the checks.

It is by no means essential that the checks A and B should be duplicates of each other, and, in fact, they may differ in many particulars with advantage—as, for instance, the passenger's check may omit the directions which are essential to the baggage-check B, which omission may in case of loss of this check afford greater security, as in such case the finder would not have the means of so easily tracing the baggage and obtaining wrongful possession of it. It will be sufficient in most cases that the checks A and B are correspondingly numbered, as shown in the drawing, or that they bear corresponding characters or marks of some kind, which serve to clearly identify them with each other.

C represents a baggage-insurance ticket or certificate, shown in the drawing as attached to and forming a part of the passenger-check A. This ticket is to bear a policy or certificate, executed by the insurer, to the effect that the baggage to which it relates and with which it is identified is insured for the sum and upon the terms and conditions named in said policy or certificate. This insurance-ticket should be identified with the passenger and baggage checks A and B by means of corresponding numbers or other marks, so that in case it should be detached from the check A it would, nevertheless, by reason of its identification with the check A and the baggage to which the check B is in practice attached, be as fully available to accomplish its purpose as if it had never been detached from the check A.

It is evident from the above statement that if the insurance-ticket is fully identified with the passenger and baggage checks A and B there will be no necessity of having the ticket C attached to the check A, since as each is identified with the other two the check A and ticket C will accomplish their respective objects when separated from each other as perfectly as when united. Their union is a mere matter of convenience.

D represents a ticket or check properly identified with the checks A and B and bears the name of the general baggage-master of the carrying company and words denoting that a local or station agent has issued a baggage-check which corresponds to or is identified with the check or ticket D. This ticket should state the destination of the baggage upon which the issued check was used. If a lock-check or other chargeable device is used, the ticket D may state the rate collected, as well as any charge collected for extra baggage, and should be signed by the station-agent. This ticket D is appropriately styled "Baggage-Master's Notice-Check" and may be so marked, and bears a notice to the baggage-master, or a report from the station-agent to the baggage-master, of the disposition of the checks A and B.

E is a stub or record check or ticket properly identified with the checks A and B and the check or ticket D, and it bears a brief record of the disposition of the checks A and B and the baggage to which they relate. This record-check is to be filed for reference.

The checks D and E preferably carry the names of the months and the days thereof, so arranged that like the checks A and B, when folded properly upon each other, the corresponding names of the months and days can be cut out with a single motion of a punch.

For convenience in use the checks or tickets A, B, D, and E are made of card-board, thick paper, or similar material, and are joined to each other in a strip, preferably in the order shown in the drawing. They are, however, preferably so joined that they are easily separated along the lines a, formed in the common way of weakening the union by cutting or punching out a portion of the material. The lines a should be so related to the disposition of the dates upon any contiguous checks that when folded along these lines the dates will be superimposed if it is desired to indicate a date upon two tickets at the same time. The arrangement shown in the drawings is such that the four tickets can be folded upon each other along the lines a and each simultaneously dated by punching out superimposed parts.

The check-strip may be continued beyond the check E, to afford room for printed directions or instructions for the issuing and use of the checks. A number of these strips may be bound or secured together, as with a rivet or other fastening passed through a hole b near the end of the strips, and the number of strips fastened together—say from fifty to one hundred—constitute a book.

For convenience in comparing any of the D checks with the E checks these checks may, in addition to the number or other marks by which they are identified with each other and with the checks A and B, carry other marks or numbers by which they are identified with the book or the stub of the book from which they were taken. This number is designated in the drawing as "Book No. 50," while the number which identifies all the checks with each other is designated as "No. 1,018."

The strips of tickets composing the books may not all of them be completed checks or tickets when printed and bound together, and for convenience it is preferred that certain parts shall be left blank—as, for instance, the direction for transportation on the baggage-check B and certain matter on the tickets D and E. This matter can easily and quickly be written in to conform to existing circumstances at or about the time the checks A and B are issued. I have indicated in the drawing the matter which may conveniently be written in by writing the same in script, while the standing pre-existing matter is indicated in print.

My improved locking baggage-check, for which I have executed an application for Letters Patent of even date herewith, provides a convenient and secure device for attaching the check B to the baggage. By its use the check is secured to the lock and to the baggage in such manner that it cannot be removed therefrom without the use of the key, which, being in the temporary custody of the passenger, must be presented with the check A for the redemption or recovery of the baggage to which is locked the check B. In such case the key may bear corresponding numbers or marks with the checks A and B, or the key and the lock may bear corresponding numbers or marks, in which case there will be a twofold or double check—the key and the lock and the checks A and B. I do not, however, limit my invention to any special way or means of attaching the checks to the baggage, or to checks or tickets of any special form or material, or carrying any special inscriptions or information, it being sufficient for the purposes of my invention that the several checks and tickets forming the several combinations hereinafter written shall be so marked or numbered as to be identified with each other, and shall contain or carry such directions or inscriptions as shall adapt them to accomplish the objects hereinbefore set forth.

What is claimed as new is—

1. In combination with baggage-checks A and B, identified with each other by corresponding numbers or marks, a baggage-insurance-policy ticket or certificate C, identified with the checks A and B, substantially as and for the purpose set forth.

2. In combination with baggage-checks A and B and a baggage-insurance-policy ticket or certificate C, a notice check or ticket D, identified with the checks A and B and policy-ticket C by corresponding numbers or marks, substantially as and for the purpose set forth.

3. In combination with baggage-checks A and B and a baggage-insurance-policy ticket or certificate C, a stub check or ticket E, identified with the checks A and B and with the policy-ticket C by corresponding numbers or marks, substantially as and for the purpose set forth.

4. The combination of baggage-checks A and B, a baggage-insurance-policy ticket or certificate C, a notice-check D, and a stub or record check or ticket E, each identified with the others by corresponding numbers or marks, substantially as and for the purpose set forth.

HIPPOLITE A. DERAISMES.

Witnesses:
ROBT. H DUNCAN,
JOHN J. TOWER.